Figure 1:
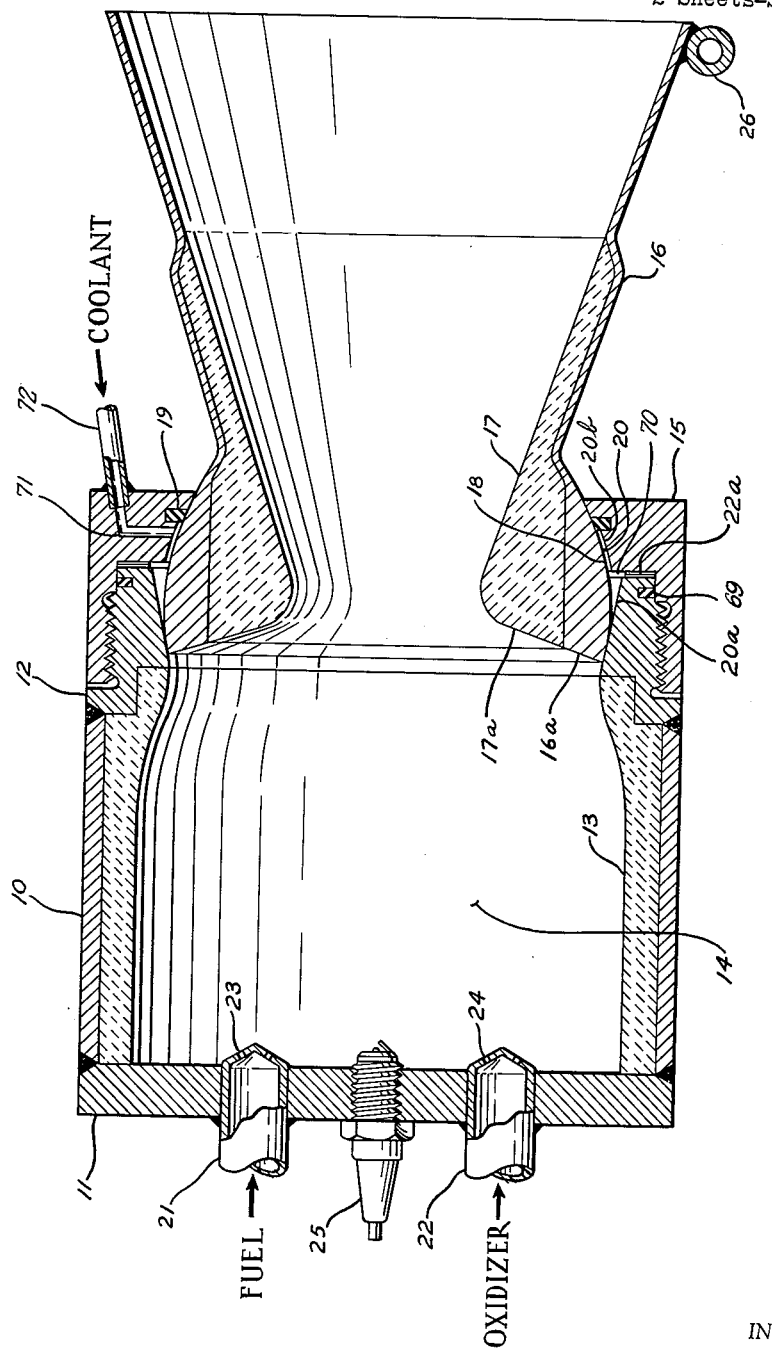

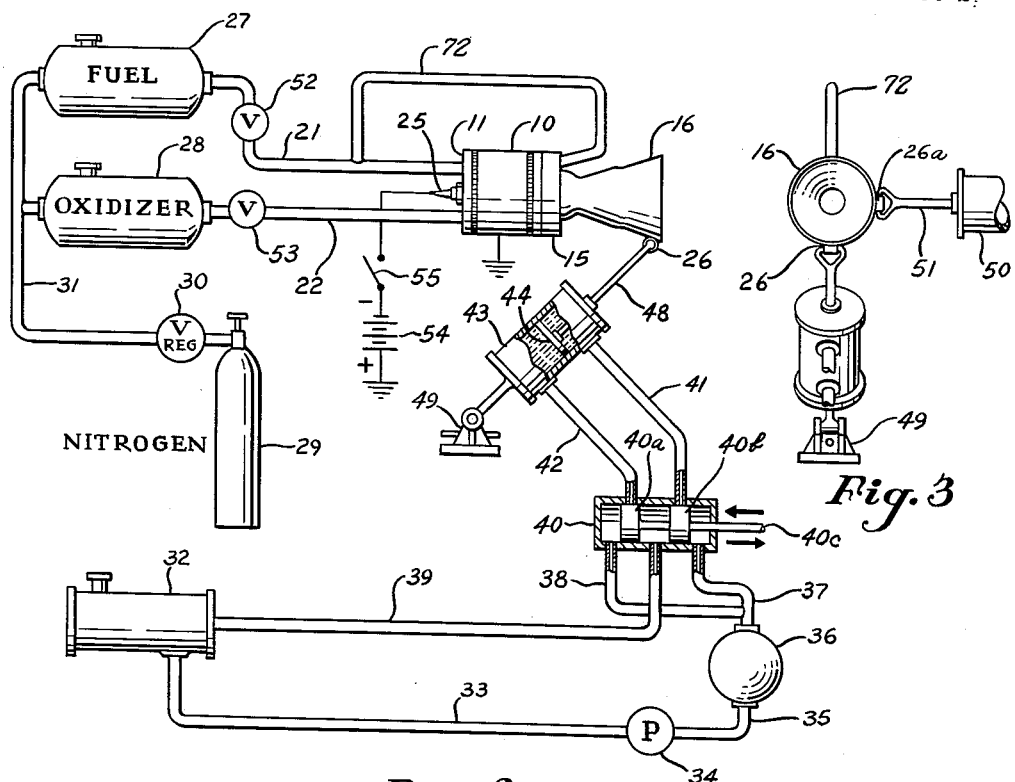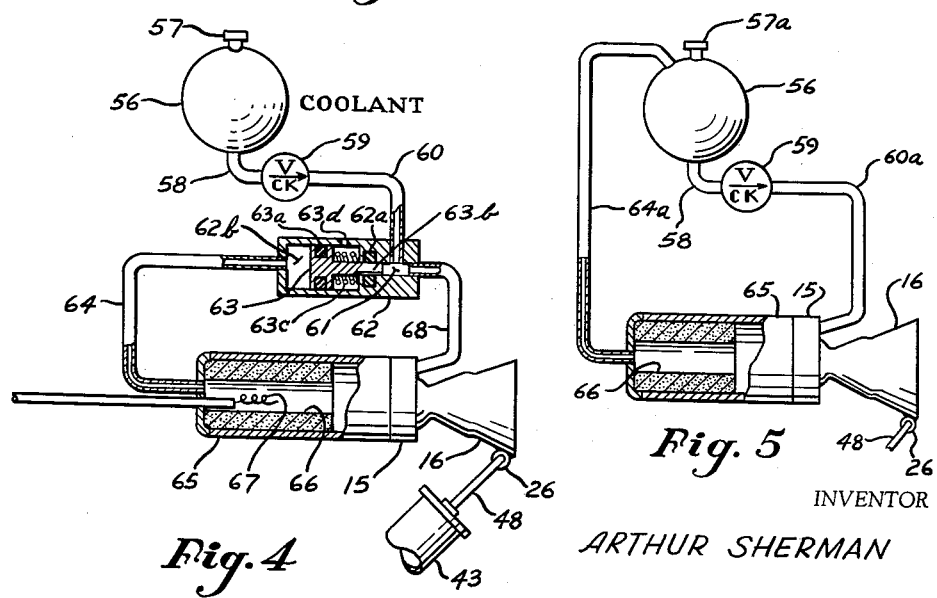

United States Patent Office 3,049,877
Patented Aug. 21, 1962

3,049,877
NOZZLE FOR REACTION MOTOR
Arthur Sherman, Clifton, N.J., assignor, by mesne assignments, to Thiokol Chemical Corporation, a corporation of Delaware
Filed Feb. 13, 1956, Ser. No. 564,964
10 Claims. (Cl. 60—35.55)

The present invention relates to jet reaction-type motors. It relates more particularly to such a motor in which the exhaust portion can move relative to the rest of the motor in order that the direction of the escaping gases of combustion may be altered with a resultant steering effect on the vehicle to which the motor is attached.

It is useful in many instances to steer a reaction motor powered vehicle by changing the direction of the thrust of the motor relative to the center of gravity of the vehicle. This has been accomplished by moving the entire motor relative to the vehicle. This is not always desirable, however, in that the fuel and oxidizer lines and other piping and wiring to the motor must be provided in a flexible form rather than in the simpler fixed type of installation ordinarily used. In the present invention, only the nozzle or after portion of the motor moves while the combustion chamber and head end of the motor remain stationary and fixed to the vehicle, and, with this arrangement, a saving in weight and complexity is achieved over the more usual arrangement of moving the entire motor. This is particularly useful where the vehicle is an aircraft.

In addition to the foregoing, the present invention includes the advantage of positive cooling of the joint between the exhaust nozzle and combustion chamber of the motor with a fluid such as fluid taken from a source apart from the motor or with fuel taken from the motor's supply. This cooling serves the useful and unique purpose of keeping the joint free to move without binding and also helps to film cool the convergent face of the nozzle.

It is, therefore, an object of the present invention to provide a reaction motor in which the direction of thrust of the gases of combustion escaping through the exhaust nozzle may be changed for the purpose of steering the vehicle in which the motor is mounted, while the combustion chamber and associated equipment of the motor remain stationary with respect to the vehicle.

It is another object of the present invention to provide a reaction motor having an exhaust nozzle movable for steering purposes wherein the joint between the movable nozzle and the fixed portion of the motor is cooled by a fluid coolant.

It is another object of the present invention to provide a reaction motor having an exhaust nozzle movable for steering purposes wherein the joint between the movable nozzle and the fixed portion of the motor is cooled by fuel taken from the fuel supply of the motor.

It is also an object of the present invention to provide a reaction motor of the foregoing type wherein the joint between the movable nozzle and the fixed portion of the motor is cooled by a fluid coolant taken from a supply source other than that of the motor.

It is another object of the present invention to provide means for both cooling the joint between a movable nozzle and the fixed portion of the motor and for film cooling the nozzle interior wall where it is exposed to the blast of hot gases from the combustion chamber of the motor.

It is another object of the present invention to provide novel systems for the cooling of the ball joint and face of the nozzle, and for changing the direction of the nozzle.

Other objects and advantages of the present invention will be apparent from the drawings and the description which follows.

In the drawings:
FIGURE 1 is a cross-sectional view of a rocket motor showing the swivelled nozzle arrangement.
FIGURE 2 is a diagrammatic view of the rocket motor and its nozzle showing a system for remote operation of the nozzle.
FIGURE 3 is a diagrammatic view looking into the nozzle of the motor and showing the control arrangement as used for movement of the nozzle in both a vertical and horizontal plane.
FIGURE 4 is a diagrammatic view showing the system arrangement, including tankage, for cooling the nozzle joint by the use of a separate coolant fluid where a solid propellant rocket motor is utilized.
FIGURE 5 is a diagrammatic view showing an alternate system arrangement, including tankage, for cooling the nozzle joint by the use of a separate coolant fluid where a solid propellant rocket motor is utilized.

In the preferred embodiment of the present invention, the nozzle of the rocket motor has a semi-spherical end toward the combustion chamber of the motor. This is held in a substantially spherical seat in such a manner as to be restrained from motion in either longitudinal direction but yet is capable of rotation to a considerable degree in both the horizontal and vertical planes or any combination of these. Such a joint is referred to hereinafter as a ball joint.

A fluid coolant, such as fuel for the motor, is brought in to this ball joint and is allowed to flow through its interstices, i.e. the spaces between the semi-spherical or ball end of the nozzle and its seat, thus effectively cooling the joint so that it will be kept free to operate and to move under the high temperature conditions existent at the nozzle of a rocket motor. A pressure-operated remote control arrangement or other suitable remotely-controlled mechanism is utilized to provide for movement of the nozzle about its seat.

With reference to FIGURE 1, a cylindrical jacket 10 is shown provided with an inner protective liner 13 of ceramic material or the like. Attached to one end of jacket 10 in pressure-tight relationship thereto, is a head 11, this configuration forming a combustion chamber 14. Separate fuel and oxidizer inlet pipes 21 and 22, respectively, lead from fuel and oxidizer tanks 27 and 28, respectively, to head 11 and pass therethrough into combustion chamber 14. Orifice holes 23 and 24 are provided at the chamber end of fuel and oxidizer inlets 21 and 22 to allow fuel and oxidizer to pass through them into combustion chamber 14. Igniter 25 also passes through head 11 into combustion chamber 14. At the opposite end of jacket 10, threaded ring 12 is attached in pressure-tight relationship to jacket 10. The inner peripheral surface of ring 12 increases in diameter in a direction away from combustion chamber 14 to provide a tapered seat for the semi-spherical end or face 18 of nozzle 16. The smallest internal diameter of ring 12 is less than the largest diameter of the semi-spherical portion of nozzle 16 so that the nozzle cannot move to the left in the figure into chamber 14. Threaded onto ring 12, on its exterior, is a locking ring or nut 15, the inside peripheral surface of which is tapered in a manner similar to that of ring 12 but in the opposite direction, i.e. with its smallest diameter toward combustion chamber 14. Its smallest diameter is smaller than the diameter of the semi-spherical portion of nozzle 16 so as to prevent movement of the nozzle to the right in FIGURE 1 away from the combustion chamber 14. Ring 15 is so proportioned in depth that it will "bottom" on adjusting shims 22a as shown in FIGURE 1 in annular chamber 70 between ring 12 and locking ring 15. A passage 71 is provided through locking ring 15 to afford communication between coolant inlet pipe 72 and chamber 70, and a seal 19 is provided in locking ring 15 to prevent leakage of coolant to the outside of the rocket motor. Seal 69 is provided to prevent leakage through the threads between locking ring 15 and ring 12.

The desired internal contour of the nozzle 16 is provided by a ceramic or other suitable material 17 formed and shaped as it is put in place, this material serving the two-fold purpose of providing proper flow characteristics for the nozzle and of helping to prevent the metallic walls of the nozzle from melting due to the high temperatures of the exhaust gases.

In operation, nitrogen under pressure from container 29 of FIGURE 2 flows through pressure regulator 30 into conduit 31 from which it enters fuel reservoir 27 and oxidizer reservoir 28 and causes them to become pressurized. Fuel is then forced under pressure from pressurized tank 27 through valve 52 and through inlet pipe 21 from which it enters combustion chamber 14 of FIGURE 1 through inlet orifices 23. Oxidizer, meanwhile, is forced under pressure from its pressurized tank 28 through valve 53 and through inlet pipe 22, from which it passes through orifices 24 into combustion chamber 14. The flow through conduits 21 and 22 is controlled by opening or closing valves 52 and 53. Switch 55 is then closed to provide an electric current from battery 54 to igniter 25. The intermingled propellants are thereupon ignited by a spark or flame from igniter 25 and burn in chamber 14 creating a chamber pressure because of the restriction at the chamber exit brought about by the nozzle. Simultaneously with this action, fuel is brought under pressure from pressurized tank 27 through inlet pipe 72 into passage 71 from which it passes into the crack or interstice 20 between face 18 of nozzle 16 and the internal faces of rings 12 and 15. The fuel or coolant is substantially at the pressure of the incoming fuel to the combustion chamber since it comes from the same source of supply, and therefore has a pressure greater than that in the combustion chamber, thereby allowing it to flow through interstice 20 into combustion chamber 14 and down the faces 16a and 17a of nozzle 16 and line 17 respectively. This action effectively cools the faces 16a and 17a and mating surfaces 18, 20a and 20b and thus keeps the latter from overheating and thus prevents binding and excessive friction.

The ordinary manufacturing tolerances and irregularities found in such equipment give sufficient clearance to allow flow to occur through the interstices of the ball-joint and it is therefore not necessary to provide special passages or channels to accommodate it. Flow will be effective through such a joint so long as the joint is not of a very closely-lapped nature and so long as the joint is not excessively loose or "sloppy," in which latter case cooling will occur but coolant will be wasted. A joint in which the "ball" can be rotated freely but in which motion longitudinally of the motor is either prevented entirely or is very slight is deemed to be ideal. Adjustment of the clearance is obtained by rotation of locking ring 15, thus moving it toward or away from chamber 14 to decrease or increase the degree of tightness of the joint.

In FIGURE 2 is shown a pressure-operated system of the hydraulic type for causing motion of the nozzle. A supply tank or reservoir 32 containing hydraulic fluid is connected through conduit 33 to pump 34 from which the fluid is pumped through conduit 35 into accumulator 36. From here it passes through conduits 37 or 38 into slide valve 40 which comprises two pistons 40a and 40b mounted on a common piston rod 40c. From valve 40, the fluid flows through either conduit 41 or 42 depending upon the position of its pistons to enter pressure-tight hydraulic cylinder 43 which is at one end pivotally and universally attached by means of universal joint 49 to a fixed portion of the motor or its attached vehicle in the manner shown in FIGURES 2 and 3. A piston 44 is slidable in cylinder 43 and is attached by means of piston rod 48 to pivotal attachment or bearing 26 on the nozzle 16 aft of the ball joint. A return pipe or conduit 39 is communicably connected from the center of valve 40 to tank 32.

In operation, the hydraulic system operates in the following manner. Fluid is provided at valve 40 in FIGURE 1 as previously described. It will then be seen that as the double-piston slide 40a, 40b and 40c is moved to the left in FIGURE 1, conduits 37 and 41 will communicate with one another and conduits 39 and 42 will also communicate with one another. Conduit 38, however, will be blocked by piston 40a. A flow of hydraulic fluid will therefore occur through conduit 37 into conduit 41 through cylinder 43 on the piston rod side of piston 44 thus causing piston 44 to move downward to the left in the figure to force fluid from the opposite side of piston 44 out of cylinder 43 through conduit 42, valve 40, and conduit 39 back into supply tank 32. Movement of double-piston slide 40a, 40b and 40c to the right in FIGURE 1 will result in communication between conduits 38 and 42 on their side of piston 44 and between conduits 41 and 39 from their side of piston 44, conduit 37 now being blocked by piston 40b. This results in a hydraulic force on piston 44 to cause movement of piston 44 upward to the right in FIGURE 1 and flow of fluid from cylinder 43, on the piston rod side of piston 44, out through conduit 41, valve 40 and conduit 39 back into the supply tank. Intermediate positions of valve 40 will control the rate of flow of hydraulic fluid through the system to move piston 44 slowly or rapidly or to stop it at some intermediate position. The movement of piston 44 and its attached rod 48 will cause nozzle 16 to rotate to a considerable extent about its ball joint in the vertical plane.

A similar hydraulic system is utilized to operate piston rod 51 in hydraulic cylinder 50 to rotate nozzle 16 about its ball joint in the same manner as previously described but in a plane substantially ninety degrees to the motion induced by cylinder 43 and its related parts. Piston rod 51 is connected to pivotal attachment 26a on nozzle 16 at a position ninety degrees from that of pivotal attachment 26, and its related cylinder 50 lies in a plane substantially ninety degrees from that of cylinder 43. A separate valve of the type shown in valve 40 is utilized in connection with cylinder 50 so that cylinders 43 and 50 are individually operable. It will be seen that by proper manipulation of these valves, any desired combination or degree of motion of the nozzle may be obtained within a conical locus having its apex at the ball-joint of nozzle 10.

In FIGURE 4, a solid propellant rocket motor 65 is provided with a nozzle 16 of the type previously described. A solid propellant charge 66 is located within motor 65 along with an igniter 67 and a conduit 64 communicably connects the combustion chamber of motor 65 with the interior of body 62 in its dome or chamber 62b above piston 63. Piston 63 is slidable in valve body 62 and seal 63a is provided between the mating surfaces. Piston 63 has an integral cylindrical extension or plunger 63b which is arranged to slide in chamber 61 through seal 62a. This extension is surrounded by helical spring 63c and the area in which the spring is located is vented to the atmosphere through vent 63d. Chamber 61 is communicably connected to the interstices 20 of the ball joint of the motor nozzle 16 by means of conduit or pipe 68. A supply tank or reservoir 56 containing liquid coolant and having a vented filler cap 57 is connected by conduit 58 to check valve 59 through which the coolant is free to flow in the direction of the arrow into conduit 60 which is in turn communicably connected to coolant chamber 61. The liquid coolant can be water or another non-combustible liquid but it is usually preferable that the liquid coolant be a fuel in order that it will be consumed within the motor before it leaves nozzle 16. Typical of the liquid fuels which can be used are alcohol and kerosene.

In operation, the solid propellant is ignited by igniter 67 to generate a quantity of gas in the motor. Since the nozzle outlet to the motor restricts the flow of this gas out of the nozzle end of the motor, a considerable pressure is built up within the motor and a flow of gas will occur through conduit 64 into chamber 62b of pump body 62. Gas pressure is thereby exerted upon pressure expansible piston 63 in body 62 moving piston 63 to the right in FIGURE 4 and thus causing its extension 63b to reduce the volume of coolant chamber 61. Since chamber 61 is filled with coolant liquid from tank 56, and since flow cannot occur back into tank 56 because of check valve 59 which allows full flow only in the direction of chamber 61, coolant fluid will be forced from chamber 61 through conduit 68 to flow through the interstices of the ball-joint of nozzle 16 in the manner previously described. Coolant chamber 61 is sufficiently large to provide enough coolant to cool the joint and nozzle faces for the duration of the burning of the solid propellant. Hydraulic cylinders 43 and 50 are employed as with the liquid propellant engine to provide for changing the direction of the nozzle.

In FIGURE 5 is shown an alternate system for supplying liquid coolant from a coolant reservoir separate from the propellant supply of the engine. As in the case of the system shown in FIGURE 4, this system is primarily useful where a solid propellant motor is employed. The system comprises, a coolant tank or reservoir 56 the same as that in FIGURE 4 but with a pressure-tight filler cap 57a, a conduit 58 communicably connecting check valve 59 and coolant tank 56, a conduit 60a communicably connecting valve 59 directly with the inlet and interstices 20 of the ball joint of nozzle 16, and a conduit 64a communicably and directly connecting reservoir 56 with the interior of motor 65. Operation of this system occurs in a manner similar to the system shown, except that gas under pressure from the interior of the motor is carried by conduit 64a directly into reservoir 56 which becomes pressurized, due to its pressure-tight condition brought about by pressure-tight cap 57a, and causes coolant to be forced from reservoir 56 through conduit 58, through check valve 59 which allows free flow in this direction only, and thereafter through conduit 60a into the interstices 20 of the ball joint of nozzle 16. Flow of coolant will occur through the interstices of the ball-joint because the pressure of the coolant is greater than that existent in the combustion chamber of the motor.

The system shown in FIGURE 5 may be preferable in some instances of installation in the vehicle depending upon the structural and performance limitations of the vehicle in which the motor is mounted.

The separate coolant systems shown in FIGURES 4 and 5 can also be used with a liquid propellant motor if it should be preferred that a coolant other than a propellant be used. In that case, the coolant system is connected exactly as shown in FIGURES 4 or 5 and the pipe 24 of FIGURE 2 is omitted.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A reaction motor having a combustion chamber, a ball joint mounted dirigible nozzle in communication therewith, said nozzle being dirigible during operation of the reaction motor, interstices in said ball joint between the ball and its mating surfaces, an inlet to the interstices, and means for flowing coolant through said inlet and said interstices.

2. The invention set forth in claim 1 with the said coolant comprising a liquid fuel.

3. The invention set forth in claim 1 with the said coolant comprising at least one propellant of the motor.

4. A reaction motor having a combustion chamber, a ball joint mounted dirigible nozzle in communication therewith, said nozzle being dirigible during operation of the reaction motor, interstices in said ball joint between the ball and its mating surfaces, a propellant in said combustion chamber, means for causing ignition of said propellant in said combustion chamber, a substantially pressure-tight reservoir containing liquid coolant, a conduit communicably connecting the combustion chamber and the reservoir, and a conduit communicably connecting the reservoir and the interstices of said ball joint, whereby combustion in the combustion chamber will cause pressurization of the reservoir and will force coolant therefrom through the interstices of the ball joint.

5. The invention set forth in claim 4 with the said coolant comprising a liquid fuel.

6. A reaction motor having a combustion chamber, a ball joint mounted dirigible nozzle in communication therewith, interstices in said ball joint between the ball and its mating surfaces, a propellant in said combustion chamber, means for causing ignition of the propellant in the combustion chamber, a vented reservoir containing liquid coolant, a plunger slidable in a coolant chamber, pressure expansible means attached to said plunger, a conduit communicably connecting said combustion chamber and said pressure expansible means, conduit means communicably connecting the reservoir and the coolant chamber, a check valve in said conduit permitting free flow in the direction of the coolant chamber, and a conduit communicably connecting the coolant chamber with the said interstices of the ball joint, whereby combustion in the combustion chamber causes pressurization of said pressure expansible means and movement thereby of said plunger in the coolant chamber to pump coolant through the interstices of said ball joint.

7. The invention set forth in claim 6 with the said coolant comprising a liquid fuel.

8. In a reaction motor having a combustion chamber, a ball joint mounted dirigible nozzle in communication therewith, said nozzle being dirigible during operation of the reaction motor, a fuel supply to said motor, interstices in said ball joint between the ball and its mating surfaces, an inlet to the interstices, a conduit communicably connecting said fuel supply and said inlet, and means for flowing fuel from the fuel supply through the said inlet and said interstices.

9. A reaction motor having a combustion chamber, a ball joint mounted dirigible nozzle in communication therewith, said nozzle being dirigible during operation of the reaction motor, interstices in said ball joint between the ball and its mating surfaces, an inlet to the interstices, means for flowing coolant through said inlet and said interstices, at least one piston pivotally attached to the outer end of said nozzle, a pressure-tight cylinder in which said piston is slidable, and means for supplying fluid under pressure to the interior of said cylinder.

10. The invention set forth in claim 9 but including two of said pistons and cylinders arranged with their nozzle pivotal attachments substantially ninety degrees apart.

References Cited in the file of this patent

UNITED STATES PATENTS

| | | |
|---|---|---|
| 1,642,752 | Landon | Sept. 20, 1927 |
| 1,698,822 | Paxton | Jan. 15, 1929 |
| 2,472,839 | Kramer | June 14, 1949 |
| 2,510,561 | De Laval | June 6, 1950 |
| 2,544,422 | Goddard | Mar. 6, 1951 |
| 2,658,332 | Nicholson | Nov. 10, 1953 |
| 2,695,496 | Goddard | Nov. 30, 1954 |

FOREIGN PATENTS

| | | |
|---|---|---|
| 697,721 | Great Britain | Sept. 30, 1953 |